(12) United States Patent
Queru et al.

(10) Patent No.: US 8,572,265 B2
(45) Date of Patent: Oct. 29, 2013

(54) OPPORTUNISTIC NETWORK UPDATES

(75) Inventors: Jean Baptiste Maurice Queru, Foster City, CA (US); Joseph LaPenna, San Francisco, CA (US)

(73) Assignee: Google Inc., Mountain View, CA (US)

( * ) Notice: Subject to any disclaimer, the term of this patent is extended or adjusted under 35 U.S.C. 154(b) by 245 days.

(21) Appl. No.: 13/249,305

(22) Filed: Sep. 30, 2011

(65) Prior Publication Data
US 2012/0233287 A1    Sep. 13, 2012

Related U.S. Application Data

(63) Continuation of application No. 13/216,478, filed on Aug. 24, 2011.

(60) Provisional application No. 61/451,885, filed on Mar. 11, 2011.

(51) Int. Cl.
*G06F 15/16* (2006.01)

(52) U.S. Cl.
USPC .......................................................... 709/228

(58) Field of Classification Search
USPC .......................................................... 709/228
See application file for complete search history.

(56) References Cited

U.S. PATENT DOCUMENTS

| | | | |
|---|---|---|---|
| 6,556,817 B1 | 4/2003 | Souissi et al. | |
| 7,076,237 B2 | 7/2006 | Dawson et al. | |
| 7,130,912 B2 * | 10/2006 | Nishikado et al. | 709/229 |
| 7,454,191 B2 | 11/2008 | Dawson et al. | |
| 7,984,161 B2 * | 7/2011 | Esteve Balducci et al. | 709/227 |
| 2003/0014521 A1 * | 1/2003 | Elson et al. | 709/225 |
| 2006/0047775 A1 | 3/2006 | Bruck et al. | |
| 2007/0005728 A1 | 1/2007 | Elbury et al. | |
| 2007/0015502 A1 * | 1/2007 | Annic | 455/425 |
| 2010/0272033 A1 * | 10/2010 | Fwu et al. | 370/329 |
| 2010/0291950 A1 * | 11/2010 | Lin et al. | 455/456.3 |
| 2010/0293266 A1 * | 11/2010 | Schilling et al. | 709/224 |
| 2011/0202656 A1 * | 8/2011 | Gentile et al. | 709/226 |

FOREIGN PATENT DOCUMENTS

EP    2045968 A1    4/2009

OTHER PUBLICATIONS

Zaharia, Matei A., "Fast and Optimal Scheduling over Multiple Network Interfaces", (Abstract) University of Waterloo, May 15, 2007, 4 pages.

Discussion thread regarding desiring an iPhone to send text messages when coming back online, Dec. 20, 2009, 4 pages, http://modmyi.com/forums/3rd-party-apps-requests/695030-writing-sms-while-no-signal-send-later-automatically.html.

Notification of Transmittal of the International Search Report and the Written Opinion of the International Searching Authority, or the Declaration issued in PCT/US2012/028766 dated Jun. 1, 2012, 13 pages.

* cited by examiner

*Primary Examiner* — John MacIlwinen
(74) *Attorney, Agent, or Firm* — Fish & Richardson P.C.

(57) ABSTRACT

Methods, systems, and apparatus, including computer programs encoded on a computer storage medium, for providing opportunistic network updates. In one aspect, a method includes determining, by a queue manager on a mobile device that has a network interface, to fulfill one or more requests to upload or download data through the network interface, and in response to determining to fulfill the requests, applying, by the queue manager, one or more rules to the requests, to classify each request as a request that is to be fulfilled, or a request that is not to be fulfilled. The method also includes causing, by the queue manager, the requests that are classified as to be fulfilled to be fulfilled, or the requests that are classified as not to be fulfilled to not be fulfilled.

13 Claims, 5 Drawing Sheets

OPPORTUNISTIC NETWORK UPDATES

CROSS-REFERENCE TO RELATED APPLICATIONS

This application is a continuation of and claims priority from U.S. patent Ser. No. 13/216,478, filed Aug. 24, 2011, which claims the benefit of U.S. Pat. App. No. 61/451,885, filed Mar. 11, 2011, the contents of which are incorporated herein by reference in their entirety.

BACKGROUND

In a wireless network environment, network connections are computationally expensive to establish, and create difficulties if they are kept open unnecessarily. For example, to transmit a small amount of data, a mobile device may power on its radio for an extended period of time, draining its battery to an extent which may not be justified if the data was unimportant.

SUMMARY

According to one general implementation, application-specific rules may be established to assist a mobile device in determining whether to transmit or not transmit data that is queued for transmission. The rules may establish that certain data should not be transmitted, or should not be immediately transmitted, such as duplicate requests, requests for unimportant or non-critical information, or requests that can be satisfied at a later time, such as a time when a network connection has already been established. The mobile device transmits data that the rules have indicated should be transmitted, and performs some other action, e.g., delaying, deleting, aggregating, ignoring, on data that the rules have indicated should not be transmitted.

In general, another aspect of the subject matter described in this specification may be embodied in methods that include the actions of determining that a network connection has been established, then determining that multiple requests to communicate data over the network connection that stored in a data transmission queue represent a same type of request, and selecting one of the multiple requests. The actions also include transmitting only the selected one of the multiple requests over the network connection.

In general, another aspect of the subject matter described in this specification may be embodied in a system including a computer-readable storage medium configured to store multiple data upload or download requests, and rules for filtering the requests, and a network interface configured to establish a network connection. The system also includes a rules engine configured to evaluate the multiple data upload or download requests using the rules, establish that particular data upload or download requests are recurring requests, based on evaluating the multiple data upload or download requests using the rules, and select a subset of the recurring requests. The rules engine is also configured to delete the subset of the recurring requests, and communicate any recurring requests that were not selected as part of the subset, over the network connection.

In general, another aspect of the subject matter described in this specification may be embodied in methods that include the actions of determining, by a queue manager on a mobile device that has a network interface, to fulfill one or more requests to upload or download data through the network interface, and in response to determining to fulfill the requests, applying, by the queue manager, one or more rules to the requests, to classify each request as a request that is to be fulfilled, or a request that is not to be fulfilled. The actions also include causing, by the queue manager, the requests that are classified as to be fulfilled to be fulfilled, or the requests that are classified as not to be fulfilled to not be fulfilled.

Other aspects include corresponding systems, apparatus, and computer programs, configured to perform the actions of the methods, encoded on computer storage devices.

These and other implementations may each optionally include one or more of the following features. Determining to fulfill the one or more requests further includes determining that a predetermined period of time has elapsed since a previous request to upload or download data has been fulfilled. Determining to fulfill the one or more requests further includes determining a characteristic associated with one or more of the requests, determining a predetermined period of time associated with the characteristic, and determining that the predetermined period of time has elapsed since a previous request to upload or download data has been fulfilled. The characteristic includes a priority of the request.

In some implementations, causing requests that are classified as not to be fulfilled to not be fulfilled includes deleting the requests that are classified as not to be fulfilled. Classifying each request as a request that is to be fulfilled or a request that is not to be fulfilled further includes identifying information associated with each request that indicates an application that submitted the request. Classifying each request as a request that is to be fulfilled, or a request that is not to be fulfilled further includes determining that the request is a recurring request or a non-recurring request, respectively.

In some implementations, the actions include receiving, by the queue manager, a request from an application to register one or more of the rules, and registering, by the queue manager, the one or more rules based on receiving the request to register one or more of the rules. One or more of the rules specify that, when one or more newer requests submitted by a particular application are queued, the newer requests are to be fulfilled and one or more older requests submitted by the particular application are not to be fulfilled. One or more of the rules specify that two or more of the requests are to be fulfilled simultaneously. One or more of the rules specify that two or more of the requests are to be fulfilled as a batch. One or more of the rules specify that one or more of the requests is not to be fulfilled until a predetermined event occurs.

In some implementations, the predetermined event includes an elapsing of a predetermined period of time. Determining that the multiple requests represent a same type of request includes determining that the multiple requests are recurring requests. Determining that the multiple requests are recurring requests includes determining that the multiple requests are periodic requests for updated location information. One or more of the requests includes a request to synchronize data between a mobile device and a server. The actions include filtering the multiple requests that are not selected. Determining that the multiple requests represent a same type of request includes determining that the multiple requests have a same priority.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
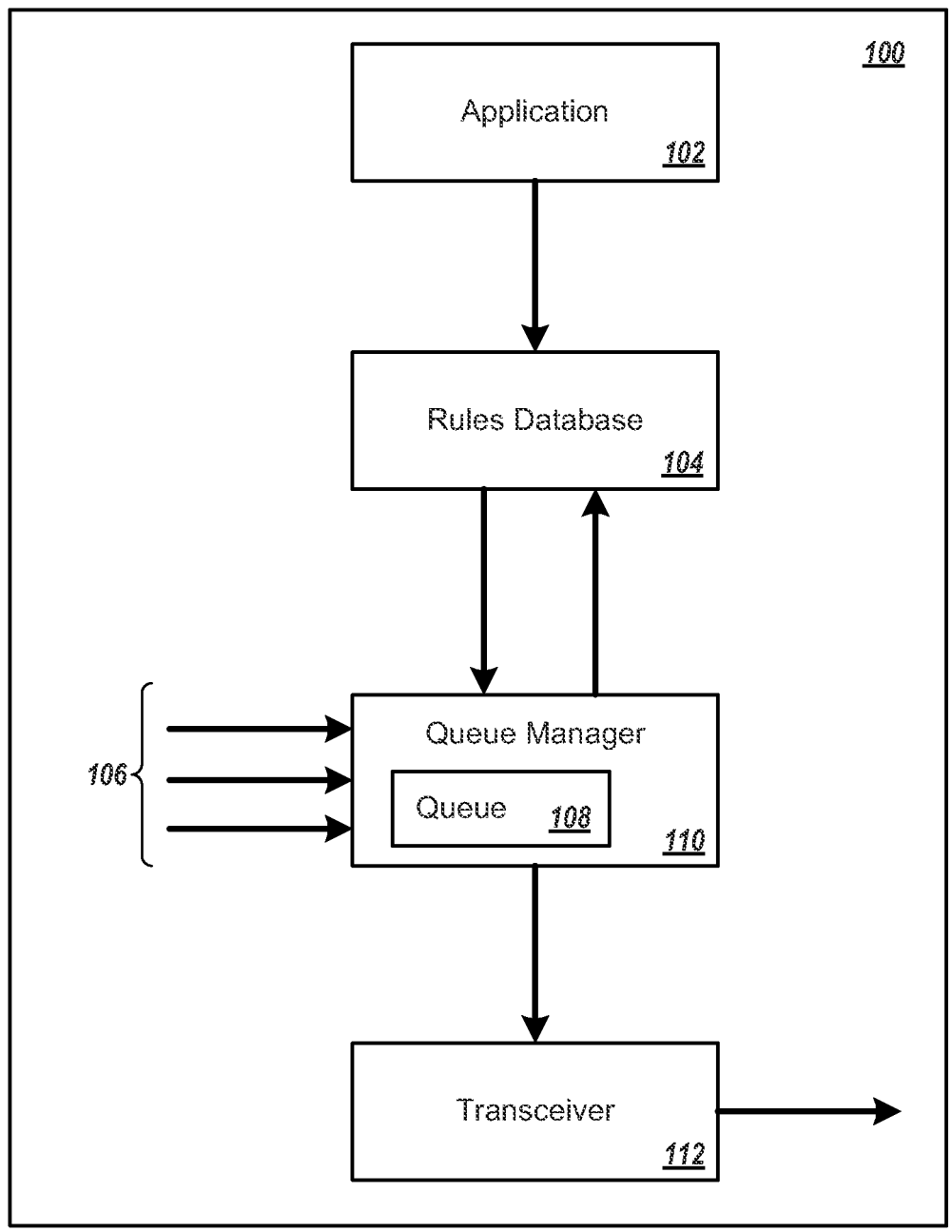
FIG. 1 is a diagram of an example mobile device.

FIG. 1 is a diagram of an example mobile device 100 that includes a network interface through which data is uploaded or downloaded, and a computer-readable medium that stores an application 102. The application 102 registers, such as during installation of the application 102, one or more rules with a rules database 104.

Over time, the application 102 initiates requests 106 to upload or download data through the network interface. The requests 106 may be queued in a queue 108 rather than being immediately fulfilled. A queue manager 110 may process the queue 108, such as periodically, in response to a high priority request, in response to a notification that a network connection has been established, in response to a notification that the communication speed of the mobile device 100 is greater than a threshold speed, or in response to any other event.

For each request, the queue manager 110 may identify one or more rules in the rules database 104 that apply to the request, and may apply the one or more rules to the request, to classify the request as a request that is to be fulfilled, or a request that is not to be fulfilled. Requests that are to be fulfilled may be fulfilled using a transceiver 112.

Using this framework, the mobile device 100 may delay transmitting or receiving data until multiple data transfer requests are queued. Transmitting multiple, queued requests may result in reduced battery usage as compared to immediately transmitting individual requests. Also, before transferring data, the mobile device 100 may filter the data transfer requests to remove any request that is a functional duplicate of another request. For example, multiple, queued requests for geographic location information may be filtered so that only the last request, or only the last few requests, are transmitted, thereby avoiding the transfer of outdated information.

Figure 2:
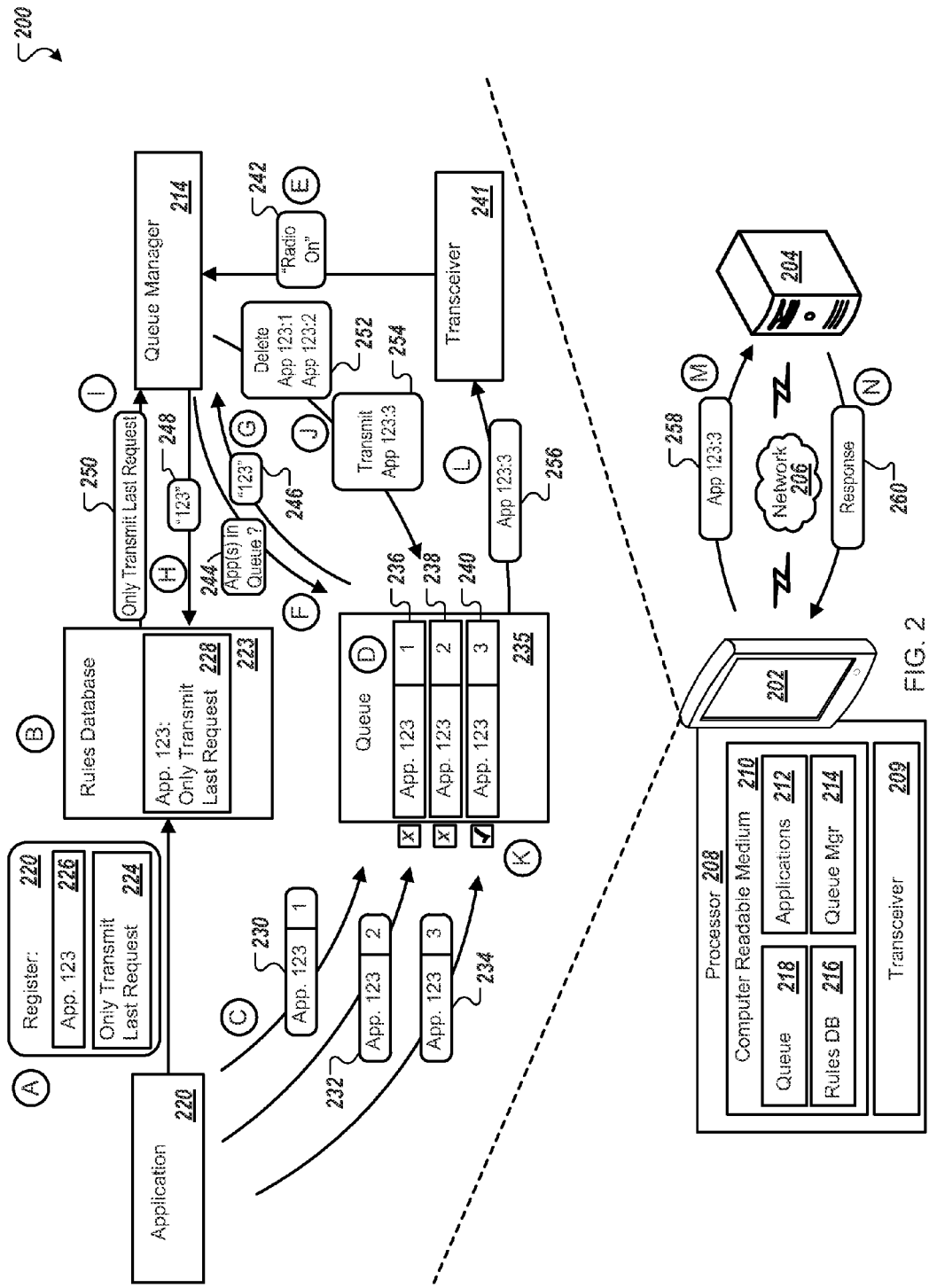
FIG. 2 is a diagram of an example system that may be used for transmitting and receiving data.

In further detail, FIG. 2 is a diagram of an example system 200 that may be used for transmitting and receiving data. The system 200 includes a mobile device 202 which communicates with a server 204 over a network 206. The network 206 may be a private network, such as an intranet, a public network, such as the Internet, or some combination thereof. The mobile device 202 includes one or more processors 208, a transceiver 209, and computer readable medium 210. The computer readable medium 210 includes one or more applications 212, a queue manager 214, a rules database 216, and a queue 218.

The applications 212 may include, for example, an application 220 (e.g., application "123"). During state "A", the application 220 sends a request 222 to a rules database 223 to register a rule 224. The application 220 may send the request 222, for example, as part of the installation of the application 220. Along with the rule 224, the request 222 includes an identifier 226 of the application 220.

The rule 224 specifies that only a latest request to upload or download data is to be transmitted when queued requests are processed. Other examples of rules include transmitting the last five requests or transmitting requests if the communication speed of the mobile device 202 is above a threshold speed. Rules are discussed in more detail below. During state "B", the rule 224 is stored in the rules database 223 in association with the identifier 226 as a rule 228.

During state "C", the application 220 sends, over time, multiple requests (e.g., requests 230, 232, 234) to a queue 235, where each request 230, 232, and 234 is a request from the application 220 to download data to or upload data from the mobile device 202. Each request 230, 232, and 234 may include, for example, an identifier of the application 220 and a timestamp.

If the request 230, 232, or 234 is a request to download data, the request 230, 232, or 234 may include, for example, a description of or a link to the data to download. If the request 230, 232, or 234 is a request to upload data, the request 230, 232, or 234 may include the data to upload or a link to the data to upload. During state "D", the requests 230, 232, and 234 are stored in the queue 235 as queue entries 236, 238, and 240, respectively. Over time, requests for other applications 212 may also be queued in the queue 235.

During state "E", a transceiver 241 turns on and a signal 242 indicating that the transceiver 241 has turned on is sent to a queue manager 243. The transceiver 241 may turn on, for example, in response to the lapsing of a time interval. For example, the mobile device 202 may be configured to turn the transceiver on once per hour. As another example, the transceiver 241 may turn on in response to the mobile device 202 detecting a communication speed above a threshold speed.

During state "F", the queue manager 243 sends a request 244 to the queue 235 to determine which applications have queue entries in the queue 235. During state "G", a message 246 is sent to the queue manager 243 indicating the applications (e.g., application "123") that have queue entries in the queue 235.

In some implementations, the queue 235 includes memory and processing logic, while in other implementations the queue 235 includes memory but does not include processing logic. In implementations where the queue 235 includes processing logic, the queue manager 243 may, as shown in FIG. 2, request that the queue 235 determine which applications have queue entries in the queue 235. In implementations where the queue 235 does not include processing logic, the queue manager 243 may determine which applications have queue entries in the queue 235.

During state "H", the queue manager 243 sends a request 248 to the rules database 223 to identify rules (if any) that are associated with the applications which include entries in the queue 235 (e.g., the application 220). During state "I", the rules in the rules database 223 that are associated with the application 220 are identified (e.g., the rule 228) and a rule 250 corresponding to or identifying the rule 228 is sent to the queue manager 243.

During state "J", the queue manager 243 sends instructions to the queue 235 corresponding to the rule 250. For example, since the rule 250 specifies that only the last request to upload data from or download data to the application 220 is to be transmitted, the queue manager 243 may send an instruction 252 to the queue 235 to delete or to hold all queue entries associated with the application 220 except the latest queue entry (e.g., to delete or hold the entries 236 and 238). The queue manager 235 may also send an instruction 254 to the queue 235 indicating that the latest queue entry associated with the application 220 (e.g., the queue entry 240) is to be transmitted.

During state "K", the queue is processed according to the instructions 252 and 254. For example, the queue entries 236 and 238 may be deleted. If, when processing the instruction 252, a queue entry (e.g., the queue entry 236 or 238) is to be held rather than deleted, the queue entry 236 or 238 may be marked accordingly (e.g., as illustrated by the "X's" next to the queue entries 236 and 238). As another example, in response to the instruction 254, the queue entry 240 may be marked as to be transmitted (e.g., as illustrated by the check mark next to the queue entry 240).

During state "L," requests to upload or download data that are classified as to be fulfilled are fulfilled. For example, requests associated with all queue entries remaining in the queue 243 may be fulfilled, or requests corresponding to queue entries marked as to be transmitted may be fulfilled. For example, the transceiver 241 may perform an upload or download request 256 associated with the queue entry 240. For example, as further illustrated During state "M", the mobile device 202 may send a request 258 to download data, over the network 206, to the server 204. During state "N", the server 204 sends a response 260 (e.g., including the requested data) to the mobile device 202.

Figure 3:
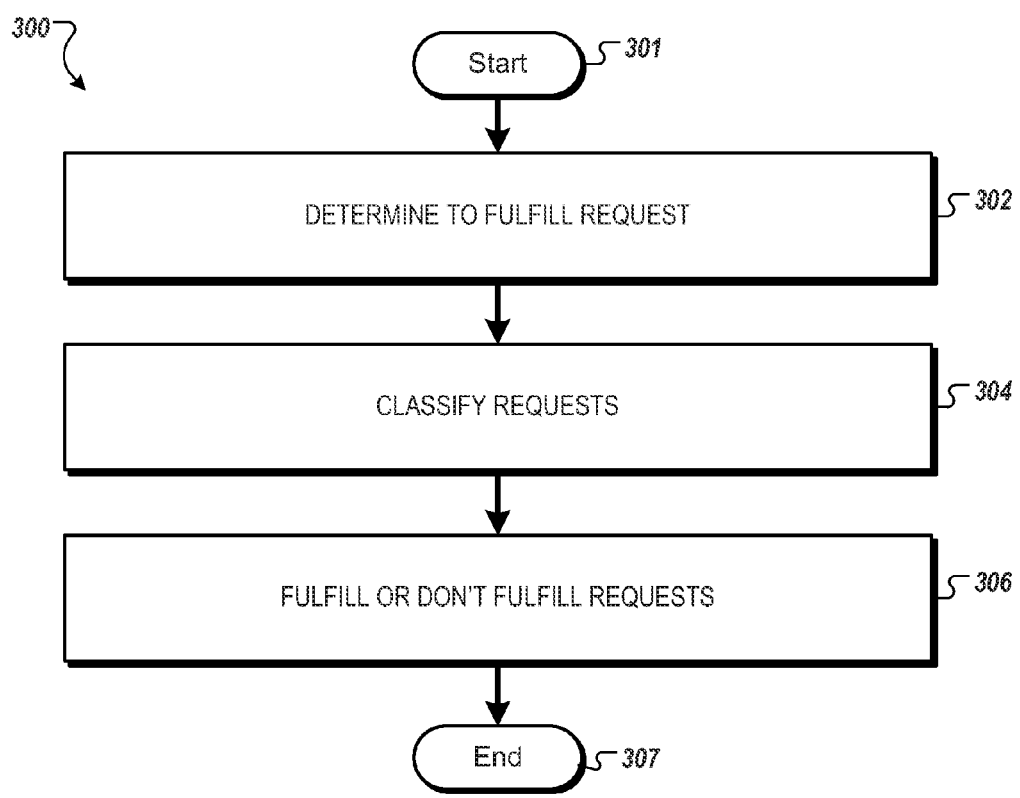
FIG. 3 is a flowchart of an example process.

FIG. 3 is a flowchart of an example process 300. Briefly, the process 300 includes: determining, by a queue manager on a mobile device, to fulfill one or more requests to upload or download data; and in response to determining to fulfill the requests, applying, by the queue manager, one or more rules to the requests, to classify each request as a request that is to be fulfilled, or a request that is not to be fulfilled. The process 300 also includes causing, by the queue manager, the requests that are classified as to be fulfilled to be fulfilled, and the requests that are classified as not to be fulfilled to not be fulfilled.

In further detail, when the process 300 begins (301), a queue manager on a mobile device determines to fulfill one or more requests to upload or download data (302). The requests to upload or download data may be stored, for example, in a queue managed by the queue manager. The queue manager may determine to fulfill one or more of the requests based on one or more conditions or events. For example, the queue manager may be notified that a communication speed of the mobile device is greater than a threshold speed.

Before the notification, the communication speed of the mobile device may have been below a threshold speed or the mobile device may have been unable to transmit. The mobile device may be configured to store requests to upload or download data in the queue until the communication speed of the mobile device is greater than a threshold speed and to send queued requests upon being notified that the communication speed of the mobile device is above a threshold speed. The communication speed of the mobile device may rise above the threshold speed if, for example, the mobile device is moved to a location where a stronger wireless signal exists or if the mobile device is docked so that it has access to a wired connection.

As another example, the mobile device may be configured to intentionally queue requests to upload or download data regardless of the connection speed of the mobile device and the queue manager may, for example in response to an event or to a condition, receive a notification to process the queued requests. For example, multiple, queued requests may be transmitted in order to reduce the number of connections that the mobile device establishes in a particular time period.

Reducing the number of connections may result in reducing a power drain on the mobile device. Establishing a connection may generally use a significant amount of power and a particular battery charge only supports a finite number of connections. Reducing the number of connections by sending multiple, queued requests over a particular connection may allow the mobile device to be used for a longer period of time on a particular battery charge as compared to establishing a connection for every request.

In some implementations, the mobile device may be configured to process queued requests on a periodic basis. The queue manager may receive a notification or may determine that a predetermined period of time has elapsed since a previous request to upload or download data has been fulfilled. For example, the queue manager may be configured to process the queue on an hourly basis.

As described in more detail below, the queue manager may apply one or more rules when processing the queue. Rules may also affect when the queue manager processes the queue. For example, a rule may specify that requests for a particular application or a particular type of application are to be fulfilled at least on a periodic basis. For example, a rule may specify that email messages are to be sent at least every thirty minutes, or that requests of a particular priority are to be transmitted at least every five minutes.

The queue manager may determine that one or more such rules have been registered and that the queue includes one or more requests that apply to at least one such rule. The queue manager may determine a predetermined period of time associated with a request and may determine to fulfill the request based on determining that the predetermined period of time has elapsed since a previous request related to the rule has been fulfilled. For example, the queue may determine that a rule has been registered specifying that email messages are to be sent at least once per hour, that the queue includes one or more email messages, and that it has been one hour since the last email message was sent.

The queue manager may determine to fulfill requests based on being notified that a request of a particular priority has been received in the queue. For example, the queue manager may be configured to fulfill requests having a particular priority or higher as soon as such a request is received. As another example, a rule may specify that requests of a particular priority or higher from a particular application or a particular type of application are to be fulfilled as soon as they are received.

If the queue manager determines that a request having a particular priority is to be fulfilled then the queue manager may determine to also fulfill some or all of the other queued requests after fulfilling the request having the particular priority. If, while fulfilling the other queued requests, a new request is received having a higher priority than the other queued requests, then the new request may be fulfilled before some or all of the other queued requests.

The queue manager may determine to fulfill requests based on other conditions or events. For example, the queue manager may be configured to fulfill requests after a predetermined number of requests (e.g., twenty) have been inserted into the queue. As another example, the queue manager may be configured to fulfill requests after a predetermined number of requests for a particular application or a particular type of application have been inserted into the queue. For example, a music application may register a rule specifying that music download requests are to be fulfilled once ten or more queued music download requests have been inserted into the queue.

In response to determining to fulfill the requests, the queue manager applies one or more rules to the requests, to classify each request as a request that is to be fulfilled, or a request that is not to be fulfilled (304). A queue manager may classify a request by, for example, marking the request in the queue (e.g., as either to be fulfilled or as not to be fulfilled). As another example, requests that are classified as to be fulfilled may be copied or moved to a different queue. Some or all requests that are classified as not to be fulfilled may, for example, be deleted from the queue.

The queue manager may identify information associated with each request that indicates an application that submitted the request and may identify one or more rules (e.g., in a rules database) associated with each application. A rule may be applicable to all requests, to requests submitted by a particular application, or to requests submitted by applications of a particular type.

For example, a rule may be applicable to requests from social applications or from media applications. Rules may be registered by an application, such as when the application is installed. As another example, a rule may be based on user input, and rules may be added or updated based on user input after an application is installed.

Some rules may relate to requests that are recurring requests, such as similar requests that may be repeated over time. Examples of recurring requests include sending a GPS (Global Positioning Satellite) location update and sending a status update in a social application. A rule may specify to filter some or all functionally duplicate requests, since, for example, some or all functionally duplicates requests may be deemed to be irrelevant, outdated, redundant, or relatively unimportant. Requests that are not processed may be deleted, or may be held (e.g., held in the queue) for consideration of later fulfillment. Requests that have been held for longer than a predetermined period of time may be automatically deleted.

For a recurring request, a rule may specify to fulfill only a last request and to not fulfill requests other than the last request. For example, a location-based application may register a rule that specifies to only send a last GPS location update. As another example, for a recurring request, a rule may specify to only send a defined number (e.g., five) of the last requests, only the first request, only a defined number (e.g., ten) of the first requests, or requests matching a predetermined spacing of requests (e.g., every fifth request).

For some applications, however, recurring requests may be deemed to be important and a rule may specify that all requests are to be fulfilled, even if some or all of the requests are recurring requests. For example, a hiking application meant to trace a user's hike may register a rule specifying to fulfill all GPS location update requests.

A rule may specify that a request is not to be fulfilled until a predetermined event occurs. For example, as described above, a request may be fulfilled after an elapsing of a predetermined period of time. As another example, a rule may specify that a request may be held indefinitely until some other request having a particular priority is inserted into the queue, and that the request is to be fulfilled when the other request is fulfilled. As another example, a rule may specify that the request is to be fulfilled if a particular communication speed or higher is detected by the mobile device.

Other conditions may be used to specify rules. As mentioned above, a rule may specify that a request is to be fulfilled immediately. As another example, a rule may specify to fulfill requests of a higher priority before requests of a lower priority. As another example, some rules may be specified in relation to a FIFO (First In First Out) paradigm and some rules may be specified in relation to a LIFO (Last In First Out) paradigm.

For example, a rule for GPS updates may specify to fulfill latest requests first and a rule for media downloads may specify to fulfill first requests first. A rule may relate to an amount of data associated with the request. For example, a rule for media downloads may specify to fulfill requests in order of download size, with smaller requests fulfilled before larger requests. A rule may relate to other characteristics, such as the reliability of a network connection. For example, a rule may specify to only transmit a request if a connection reliability is at or above a particular threshold, where a connection reliability may be determined, for example, based on a length of time of continuous connection.

A rule may be based on multiple conditions. For example, a rule relating to communication speed may specify to fulfill all requests if a communication speed is 4G, fulfill every fifth request if a communication speed is 3G and fulfill only the last request if a communication speed is 1G or 2G. As another example, a rule may be based both on connection speed and on the number of requests in the queue (e.g., either the number of total requests or the number of requests for a particular application).

For example, a rule may specify for an application that all requests are to be fulfilled if the connection speed is 4G or if there are ten or less requests in the queue for the application, or if the connection speed is 3G or if there are five or less requests in the queue for the application. As another example of multiple conditions, a rule for a social application may specify that all status updates that include text are to be fulfilled but only up to a predetermined number of other updates, such as designations (e.g., "likes", "pokes") made by the user, are to be fulfilled. In general, conditions may be specified, for example, using any number or combination of Boolean operators.

The queue manager may determine which requests to fulfill based on analyzing all registered rules and on the number of requests in the queue for each application or application type, and on one or more characteristics of each request. For example, if multiple rules for one or more applications are based on a priority of a request, and if the queue includes requests from different applications, the queue manager may determine an overall priority order of all requests and may determine to fulfill some or all of the requests based on the overall priority order.

One or more default rules may be defined. A default rule may be, for example, a system defined rule rather than an application defined rule. A default rule may be based on an application type. For example, a default rule may be defined for requests related to email, and the default rule may be used for email requests if an application-specific rule has not been registered by an email application. In general, the queue manager may determine one or more rules to use for a request based on an applicability and/or a similarity of the request to one or more rules.

Continuing with FIG. 3, the queue manager causes the requests that are classified as to be fulfilled to be fulfilled, or the requests that are classified as not to be fulfilled to not be fulfilled (306), thereby ending the process 300 (307). For example, the queue manager may notify another component (e.g., a communication component associated with the transceiver of the mobile device) to fulfill requests that have been marked in the queue as to be fulfilled or to fulfill requests that have been copied or moved to another queue. When a request is fulfilled, a notification may be sent to the application that submitted the request.

As mentioned, requests not to be fulfilled may be deleted. The requests not to be fulfilled may have been deleted at the time of classification or the requests not to be fulfilled may be deleted at a later time, either by the queue manager or by another component. As mentioned, requests that are not to be fulfilled may be held in the queue for consideration of later fulfillment.

Figure 4:
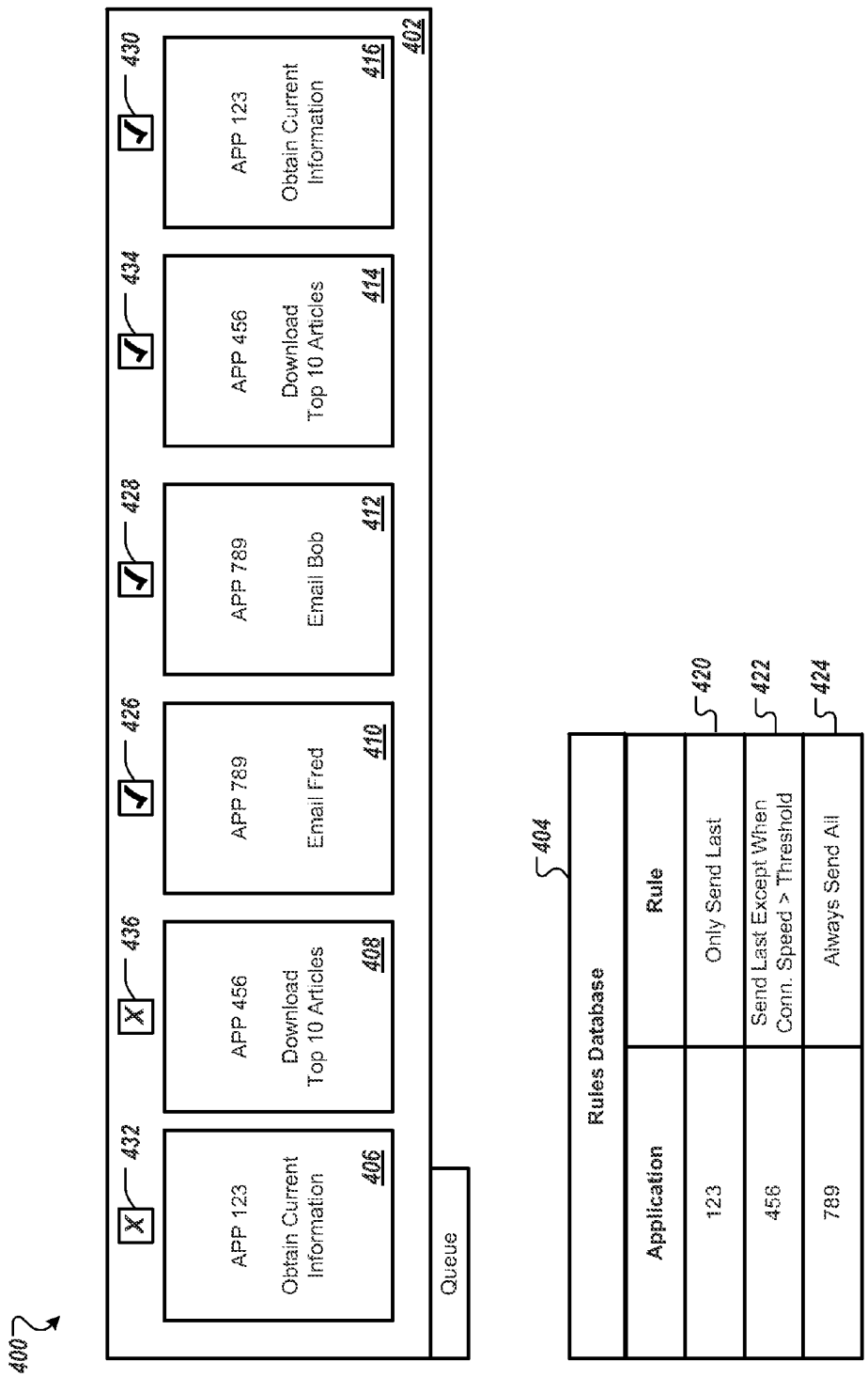
FIG. 4 illustrates an example queue and an example rules database.

FIG. 4 illustrates an example queue 402 and an example rules database 404. The queue 402 and the rules database 404 may be included, for example, in a computer readable medium of a mobile device. The queue 402 includes requests 406-416. Each of the requests 406-416 may represent, for example, a request to upload data from or download data to the mobile device. The requests 406-416 are ordered in the queue 404 from left to right according to insertion time into the queue 402. For example, the request 406 was inserted into the queue 402 before the request 408.

The queue 402 includes information associated with multiple applications. For example, the requests 406 and 416 are each associated with an application "123" and each represents a request to "obtain current information". The application "123" may be, for example, a weather forecasting application, or a stock quote application. The requests 408 and 414 are each associated with an application "456" and each represents a request to "download the top ten articles". The application "456" may be, for example, a newsreader application. The request 410, which represents a request to email "Fred", and the request 412, which represents a request to email "Bob", are each associated with an application "789", which is an email application.

The rules database 404 stores information for rules 420, 422, and 424. The rules database 404 stores, for each rule 420, 422, and 424, an identifier of an associated application. For example, the rules 420, 422, and 424 are associated with the applications "123", "456", and "789", respectively. The rule 420 specifies that only the last request made by the application "123" to upload data from the mobile device or to download data to the mobile device is to be sent.

The rule 422 specifies that only the last request to upload or download data made by the application "456" is to be sent, except when the connection speed of the mobile device is greater than a threshold speed. If the connection speed of the mobile device is greater than the threshold speed, then the rule 422 specifies that all requests to upload or download data made by the application "456" are to be sent. The rule 424 specifies that all requests to upload or download data made by the application "789" are to be sent.

When the mobile device receives a notification to send data upload and data download requests (e.g., in response to a timer event or in response to detecting a connection speed greater than a threshold speed), the rules in the rules database 404 may be applied to the queue 402 to classify each of the entries 406-416 as to be fulfilled or as not to be fulfilled. For example, the rule 424 may be applied to the requests 410 and 412 that are associated with the application "789". Since the rule 424 specifies that all requests made by the application "789" are to be fulfilled, the requests 410 and 412 may each be classified as to be fulfilled, as illustrated by indicators 426 and 428, respectively.

As another example, the rule 420 may be applied to the requests 406 and 416 that are associated with the application "123". The request 416 may be identified as the last (e.g., latest) request made by the application "123", and, according to the rule 420, the request 416 may be classified as a request to be fulfilled (e.g., as illustrated by an indicator 430) and the request 406, which may be identified as not being the last request made by the application "123", may be classified as a request to not be fulfilled (e.g., as illustrated by an indicator 432).

As yet another example, the rule 422 may be applied to the requests 408 and 414 that are associated with the application "456". Suppose the current connection speed is not greater than the threshold speed included in the rule 420. The rule 422 may then be processed essentially the same as the rule 420, meaning that only a last request made by the application "456" is to be classified as to be fulfilled.

For example, the request 414 may be identified as the last (e.g., latest) request made by the application "456", and, according to the rule 422, the request 414 may be classified as a request to be fulfilled (e.g., as illustrated by an indicator 434) and the request 408, which may be identified as not being the last request made by the application "456", may be classified as a request to not be fulfilled (e.g., as illustrated by an indicator 436).

Figure 5:
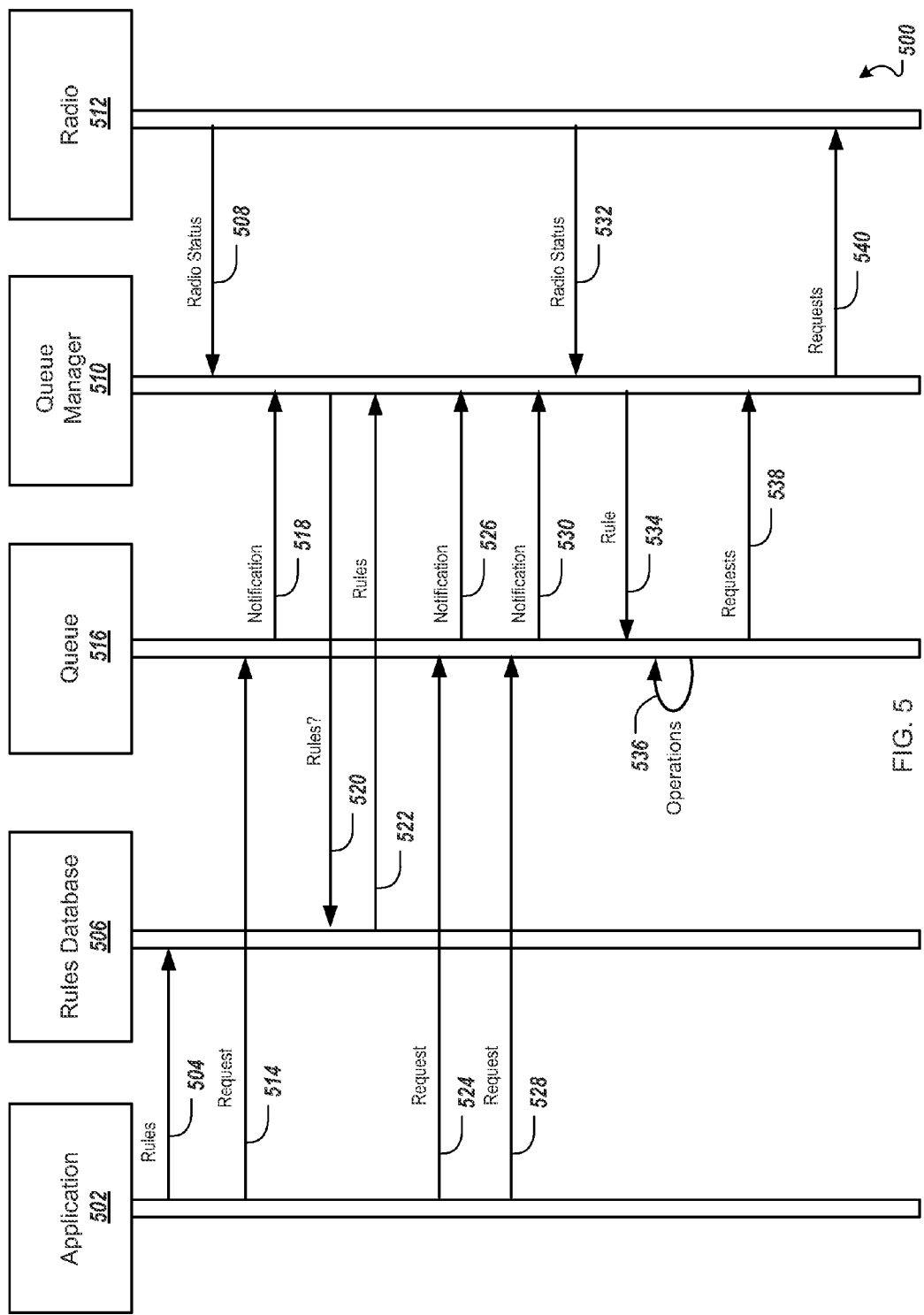
FIG. 5 is a swim lane diagram of an example process.

FIG. 5 is a swim lane diagram of an example process 500. An application 502 running on a mobile device sends, as illustrated by an arrow 504, a request to a rules database 506 to register one or more rules. The rules are registered and may be stored in the rules database 506. As illustrated by an arrow 508, a queue manager 510 receives a notification from a radio 512 that the radio 512 is not ready for transmission. For example, there may not be sufficient signal strength for transmission or the radio 512 may be programmatically turned off (e.g., to save battery power).

The application 502 generates a first request to upload or download data and sends the request, as illustrated by an arrow 514, to a queue 516. The queue 516 sends a notification of a new queue entry to the queue manager 510, as illustrated by an arrow 518. The notification may include an indication of the application associated with the newly added queue entry.

As illustrated by an arrow 520, the queue manager 510 sends a request to the rules database 506 to determine whether there are any rules associated with the application 502 (e.g., the application associated with the newly added queue entry). The rules database 506 sends a reply, as illustrated by an arrow 522, indicating the rules that are associated with the application 502 or indicating that there are no rules associated with the application 502.

In some implementations, the queue manager 512 requests information about rules from the rules database 506 each time a notification is received from the queue 516 that is associated with an application that is not known to the queue manager 512. As another example, in some implementations, the queue manager 512 requests information about rules each time a notification is received (e.g., from the radio 512) indicating that the radio 512 is ready for transmission.

As illustrated by an arrow 524, the application 502 generates a second request to upload or download data and sends the second request to the queue 516. The queue 516, in turn, sends a notification of the second request to the queue manager 510, as illustrated by an arrow 526. Similarly, the application 502 generates a third request to upload or download data and sends the third request to the queue 516, as illustrated by an arrow 528. The queue 516 sends a notification of the third request to the queue manager 510, as illustrated by an arrow 530.

As illustrated by an arrow 532, the queue manager 510 receives a notification from the radio 512 indicating that the radio 512 is ready for transmission. The radio 512 may be ready for transmission, for example, in response to detecting a communication speed greater than a threshold speed or in response to the firing of a timer event. As illustrated by an arrow 534, in response to receiving the notification that the radio 512 is ready for transmission, the queue manager 510 sends instructions corresponding to one or more rules to the queue 516. For example, the queue manager may send instructions corresponding to rules for the application 502.

Operations are performed on the queue 536 according to the instructions sent by the queue manager 510, as illustrated by an arrow 536. For example, one or more queue entries may be deleted, may be marked as to be held (e.g., not to be fulfilled), or may be marked as to be fulfilled. An indication of queue entries associated with requests that are to be fulfilled is sent to the queue manager 510, as illustrated by an arrow 538. As illustrated by an arrow 540, each request that is to be fulfilled is fulfilled using the radio 512. For example, each request may result in a request being sent, using the radio 512, to a server, to upload data to or download data from the server.

A number of implementations have been described. Nevertheless, it will be understood that various modifications may be made without departing from the spirit and scope of the disclosure. For example, various forms of the flows shown above may be used, with steps re-ordered, added, or removed.

Aspects and all of the functional operations described in this specification may be implemented in digital electronic circuitry, or in computer software, firmware, or hardware, including the structures disclosed in this specification and their structural equivalents, or in combinations of one or more of them. Aspects may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, aspects may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Aspects may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular aspects. Certain features that are described in this specification in the context of separate aspects may also be implemented in combination in a single aspect. Conversely, various features that are described in the context of a single aspect may also be implemented in multiple aspects separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all implementation, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations have been described. Other implementations are within the scope of the following claims. For example, the actions recited in the claims may be performed in a different order and still achieve desirable results.

What is claimed is:

1. A computer-implemented method comprising:
   determining, by a queue manager on a mobile device that has a network interface, that a network connection has been established or will be established through the network interface;
   in response to determining that the network connection has been established or will be established, applying, by the queue manager, one or more rules to multiple requests that have been initiated by a particular application and queued since a previous network connection had been established through the network interface, to classify fewer than all of the requests that have been initiated by the particular application and queued since the previous network connection had been established as requests that are to be fulfilled the classification being based on a rule database that associates each of a plurality of applications with one or more of a plurality of rules; and
   causing, by the queue manager, the fewer than all of the requests that have been initiated by the particular application and queued since the previous network connection had been established to be fulfilled.

2. The method of claim 1, wherein determining that a network connection has been established or will be established comprises determining that a predetermined period of time has elapsed since a previous request to upload or download data has been fulfilled.

3. The method of claim 1, wherein determining that a network connection has been established or will be established comprises:
   determining a type of request associated with one or more of the requests;
   determining a predetermined period of time associated with the type of request; and
   determining that the predetermined period of time has elapsed since a previous request to upload or download data has been fulfilled.

4. The method of claim 1, wherein causing the fewer than all of the requests that have been initiated by the particular application and queued since the previous network connection had been established to be fulfilled comprises deleting particular requests that have been initiated by the particular application and queued since the previous network connection had been established.

5. The method of claim 1, comprising identifying information associated with each request that indicates an application that submitted the multiple requests.

6. The method of claim 1, comprising determining that a particular request is a recurring request and, based on determining that the particular request is a recurring request, deleting the particular request.

7. The method of claim 1, further comprising:
   receiving, by the queue manager, a request from the particular to register one or more of the rules for classifying requests that have been initiated by the particular application and queued; and
   registering, by the queue manager, the one or more rules based on receiving the request to register one or more of the rules.

8. A system comprising:
   a computer-readable storage device configured to store multiple data upload or download requests that have queued since previous data upload or download requests have been fulfilled, and rules for filtering the requests;
   a network interface configured to establish a network connection; and
   a rules engine configured to:
      access a rule database that associates each of a plurality of applications with one or more of a plurality of rules
      evaluate the multiple data upload or download requests using the rules,
      establish that particular data upload or download requests are a same type of recurring requests that have been initiated by a same application, based on evaluating the multiple data upload or download requests using the rules,
      select a subset of the same type of recurring requests that have been initiated by the same application;
      delete the subset of the same type of recurring requests that have been initiated by the same application; and
      communicate any of the same type of recurring requests that were not selected as part of the subset, over the network connection.

9. The system of claim 8, wherein one or more of the rules specify that, when one or more newer requests submitted by a particular application are queued, only the newer requests are to be fulfilled and one or more older requests submitted by the particular application are to be deleted.

10. The system of claim 8, wherein one or more of the rules specify that two or more of the requests are to be fulfilled with a particular timing with respect to each other.

11. The system of claim 8, wherein one or more of the rules specify that two or more of the requests are to be fulfilled as a batch when another request causes a network connection to be established.

12. The system of claim 8, wherein one or more of the rules specify that one or more of the requests is not to be fulfilled until a predetermined event occurs, and that one or more of the requests are never to be fulfilled.

13. The system of claim 12, wherein the predetermined event comprises an elapsing of a predetermined period of time.

* * * * *